US008633988B2

(12) United States Patent
Higashi et al.

(10) Patent No.: US 8,633,988 B2

(45) Date of Patent: Jan. 21, 2014

(54) IMAGE PICKUP DEVICE CONTROL SIGNAL GENERATING APPARATUS AND METHOD USING SHIFT REGISTERS

(75) Inventors: Koichi Higashi, Hadano (JP); Norihiko Kuroishi, Hadano (JP)

(73) Assignee: Art Analog Japan Limited, Kanagawa (JP)

( * ) Notice: Subject to any disclaimer, the term of this patent is extended or adjusted under 35 U.S.C. 154(b) by 326 days.

(21) Appl. No.: 12/845,180

(22) Filed: Jul. 28, 2010

(65) Prior Publication Data

US 2011/0043645 A1 Feb. 24, 2011

(30) Foreign Application Priority Data

Aug. 19, 2009 (JP) ................................ 2009-189794

(51) Int. Cl.
*H04N 9/04* (2006.01)

(52) U.S. Cl.
USPC ....... 348/207.99; 348/302; 348/308; 348/311

(58) Field of Classification Search
USPC ................ 348/303–305, 312, 319, 322, 324, 348/207.99
See application file for complete search history.

(56) References Cited

U.S. PATENT DOCUMENTS

| | | | | |
|---|---|---|---|---|
| 4,426,685 | A * | 1/1984 | Lorentzen | 713/401 |
| 5,033,067 | A * | 7/1991 | Cole et al. | 377/54 |
| 5,396,290 | A * | 3/1995 | Kannegundla et al. | 348/312 |
| 5,945,862 | A * | 8/1999 | Donnelly et al. | 327/278 |
| 7,283,169 | B2 * | 10/2007 | Tanaka | 348/312 |
| 2002/0080244 | A1 * | 6/2002 | Suska | 348/222 |
| 2004/0165072 | A1 * | 8/2004 | Takaki et al. | 348/207.99 |
| 2005/0012822 | A1 * | 1/2005 | Takeda et al. | 348/207.99 |
| 2005/0021865 | A1 * | 1/2005 | Morimoto | 709/248 |
| 2010/0177230 | A1 * | 7/2010 | Himeno et al. | 348/308 |

FOREIGN PATENT DOCUMENTS

| | | |
|---|---|---|
| JP | A-2002-64753 | 2/2002 |
| JP | A-2003-8995 | 1/2003 |
| JP | A-2004-242069 | 8/2004 |
| JP | A-2005-110140 | 4/2005 |

OTHER PUBLICATIONS

Japanese Office Action mailed on Oct. 28, 2009 issued in Japanese Patent Application No. 2009-189794 (with translation).

* cited by examiner

*Primary Examiner* — Nicholas Giles
*Assistant Examiner* — Abdelaaziz Tissire
(74) *Attorney, Agent, or Firm* — Sughrue Mion, PLLC

(57) ABSTRACT

One or more control signals in specified output states are generated at one time at a predetermined timing. A command generation section generates control data, piece by piece at each predetermined timing, corresponding to the plural control signals. A register sequentially receives the generated control data at the each predetermined timing and outputs one or more pieces of the control data to a command execution section at one time at a timing predetermined for the one or more pieces of the control data. The command execution section generates, at one time, one or more control signals of a value or values corresponding to the one or more pieces of the control data received from the register at one time at a timing predetermined for the one or more pieces of the control data.

8 Claims, 16 Drawing Sheets

GENERAL CONFIGURATION 8

GENERAL CONFIGURATION 8

FIG. 2A

| XV | XP | 3-Output |
|---|---|---|
| 0 | 0 | H |
| | 1 | M |
| 1 | 0 | L |
| | 1 | L |

FIG. 2B

| XV | 2-Output |
|---|---|
| 0 | M |
| 1 | L |

DIGITAL CAMERA 1

FIG. 7

| VGRP<1:5> | VLVL<1:2> |
|---|---|
| "00001" | "11" |

TRANSFER SECTION 70

TRANSFER SECTION 72

S74

| COUNTER 1 | #1 | #2 | #3 | #4 | #5 | #6 | #7 |
|---|---|---|---|---|---|---|---|
| | SWITCHING COMMAND 1 | SWITCHING COMMAND 2 | SWITCHING COMMAND 3 | SWITCHING COMMAND 4 | SWITCHING COMMAND 5 | SWITCHING COMMAND 6 | SWITCHING COMMAND 7 |

FIG. 15

| | | | | | | | | | |
|---|---|---|---|---|---|---|---|---|---|
| COUNTER 3 | | | | | #1 | #2 | #3 | #4 | #5 |
| COUNTER 2 | | | #1 | #2 | #3 | #4 | #5 | #6 | #7 |
| COUNTER 1 | #1 | #2 | #3 | #4 | #5 | #6 | #7 | | |
| R0 | SWITCHING COMMAND 1-1 | SWITCHING COMMAND 1-2 (DELIMITER) | SWITCHING COMMAND 2-1 | SWITCHING COMMAND 2-2 (DELIMITER) | SWITCHING COMMAND 3-1 | SWITCHING COMMAND 3-2 (DELIMITER) | SWITCHING COMMAND 4-1 | SWITCHING COMMAND 4-2 (DELIMITER) | 0 |
| R1<1> | 0 | SWITCHING COMMAND 1-1 | SWITCHING COMMAND 1-1 | SWITCHING COMMAND 2-1 | SWITCHING COMMAND 2-1 | SWITCHING COMMAND 3-1 | SWITCHING COMMAND 3-1 | SWITCHING COMMAND 4-1 | SWITCHING COMMAND 4-1 |
| R1<2> | 0 | 0 | 0 | SWITCHING COMMAND 1-1 | SWITCHING COMMAND 1-1 | SWITCHING COMMAND 2-1 | SWITCHING COMMAND 2-1 | SWITCHING COMMAND 3-1 | SWITCHING COMMAND 3-1 |
| R1<3> | 0 | 0 | 0 | 0 | 0 | SWITCHING COMMAND 1-1 | SWITCHING COMMAND 1-1 | SWITCHING COMMAND 2-1 | SWITCHING COMMAND 2-1 |
| R2<1> | 0 | 0 | 0 | 0 | 0 | 0 | 0 | 0 | 0 |
| R2<2> | 0 | 0 | 0 | 0 | 0 | 0 | 0 | 0 | 0 |
| R3<1> | 0 | 0 | 0 | 0 | 0 | 0 | 0 | 0 | 0 |

FIG. 16

| | | | | | | | | | | | |
|---|---|---|---|---|---|---|---|---|---|---|---|
| COUNTER 3 | | | | | | | | | #1 | #2 | #3 |
| COUNTER 2 | | | | | #1 | #2 | #3 | #4 | #5 | #6 | #7 |
| COUNTER 1 | #1 | #2 | #3 | #4 | #2 | #6 | #7 | | | | |
| R0 | SWITCHING COMMAND 1-1 | SWITCHING COMMAND 1-2 | SWITCHING COMMAND 1-3 | SWITCHING COMMAND 1-4 (DELIMITER) | SWITCHING COMMAND 2-1 | SWITCHING COMMAND 2-2 | SWITCHING COMMAND 2-3 | SWITCHING COMMAND 2-4 (DELIMITER) | SWITCHING COMMAND 3-1 | SWITCHING COMMAND 3-2 (DELIMITER) | SWITCHING COMMAND 4-1 |
| R1<1> | 0 | SWITCHING COMMAND 1-1 | SWITCHING COMMAND 1-1 | SWITCHING COMMAND 1-1 | SWITCHING COMMAND 1-1 | SWITCHING COMMAND 2-1 | SWITCHING COMMAND 2-1 | SWITCHING COMMAND 2-1 | SWITCHING COMMAND 2-1 | SWITCHING COMMAND 3-1 | SWITCHING COMMAND 3-1 |
| R1<2> | 0 | 0 | 0 | 0 | 0 | SWITCHING COMMAND 1-1 | SWITCHING COMMAND 1-1 | 0 | 0 | SWITCHING COMMAND 2-1 | SWITCHING COMMAND 2-1 |
| R1<3> | 0 | 0 | 0 | 0 | 0 | 0 | 0 | 0 | 0 | 0 | 0 |
| R2<1> | 0 | 0 | SWITCHING COMMAND 1-2 | SWITCHING COMMAND 1-2 | SWITCHING COMMAND 1-2 | SWITCHING COMMAND 1-2 | SWITCHING COMMAND 2-2 | SWITCHING COMMAND 2-2 | SWITCHING COMMAND 2-2 | SWITCHING COMMAND 2-2 | SWITCHING COMMAND 2-2 |
| R2<2> | 0 | 0 | 0 | 0 | 0 | 0 | SWITCHING COMMAND 1-2 | 0 | 0 | 0 | 0 |
| R3<1> | 0 | 0 | 0 | SWITCHING COMMAND 1-3 | SWITCHING COMMAND 1-3 | SWITCHING COMMAND 1-3 | SWITCHING COMMAND 1-3 | SWITCHING COMMAND 2-3 | SWITCHING COMMAND 2-3 | SWITCHING COMMAND 2-3 | SWITCHING COMMAND 2-3 |

IMAGE PICKUP DEVICE CONTROL SIGNAL GENERATING APPARATUS AND METHOD USING SHIFT REGISTERS

BACKGROUND OF THE INVENTION

1. Field of the Invention

The present invention relates to an image pickup device control signal generating apparatus and method.

2. Description of the Related Art

A drive circuit for CCD charge transfer which is used to decode channel selection information and determine the output state of a selected channel is disclosed in Japanese Unexamined Patent Application Publication No. 2002-64753.

A drive circuit for CCD charge transfer in which timing signals are time-division multiplexed is disclosed in Japanese Unexamined Patent Application Publication No. 2003-8995.

A solid-state image pickup apparatus in which, based on a combination of data signal values, a vertical drive signal is selected and its value is changed is disclosed in Japanese Unexamined Patent Application Publication No. 2005-110140.

Japanese Unexamined Patent Application Publications Nos. 2002-64753, 2003-8995, and 2005-110140, however, do not disclose any configuration in which: one or more pieces of control data which select one or more control signals and specify their output states are sequentially received at predetermined timings; and the one or more pieces of the received control data are outputted at one time at a timing predetermined for them, making it possible to generate one or more control signals in specified output states at one time.

SUMMARY OF THE INVENTION

The present invention has been made in view of the above background, and it is an object of the invention to provide an improved image pickup device control signal generating apparatus and method in which: one or more pieces of control data which select one or more control signals and which specify their output states are sequentially received at predetermined timings; and the one or more pieces of received control data are outputted at one time at a timing predetermined for them, making it possible to generate one or more control signals in specified output states at one time.

To achieve the above object, the present invention provides an image pickup device control signal generating apparatus (60) for generating plural control signals used to control an image pickup device. The image pickup device control signal generating apparatus includes: a control data generator (402) that generates control data, piece by piece at each predetermined timing, corresponding to the plural control signals; a first storage unit (602) that sequentially receives the generated control data at the each predetermined timing and outputs one or more pieces of the received control data at one time at a timing predetermined for the one or more pieces of the control data; and a control signal generator (52) that generates, at one time, one or more control signals of a value or values corresponding to the one or more pieces of the control data at a timing predetermined for the one or more pieces of the control data.

According to the image pickup device control signal generating apparatus and method of the present invention: one or more pieces of control data which select one or more control signals and specify their output states can be sequentially received at predetermined timings; and the one or more pieces of the received control data can be outputted at one time at a timing predetermined for them, making it possible to generate one or more control signals in specified output states at one time.

BRIEF DESCRIPTION OF THE DRAWINGS

FIGS. 2A and 2B are diagrams showing relationships between input signals from the timing generator (TG) shown in FIG. 1 and states of control signals outputted from the V driver also shown in FIG. 1, FIG. 2A showing such relationships involving 3 level output drivers shown in FIG. 1 and FIG. 2B showing such relationships involving 2 level output drivers shown in FIG. 1;

FIG. 7 is a diagram showing an example of a switching command generated by the command generation section shown in FIG. 6;

FIG. 15 is a diagram showing an example string of eight switching commands generated by the command generation section shown in FIG. 11 and also showing example states at different clock pulses of registers in a third register holding switching commands; and FIG. 16 is a diagram showing an example string of 11 switching commands generated by the command generation section shown in FIG. 11 and also showing example states at different clock pulses of registers in the third register holding switching commands.

DESCRIPTION OF THE PREFERRED EMBODIMENTS

To facilitate understanding the embodiments described in the following of the invention, a partial configuration of general image processing equipment will be described first.

Figure 1:
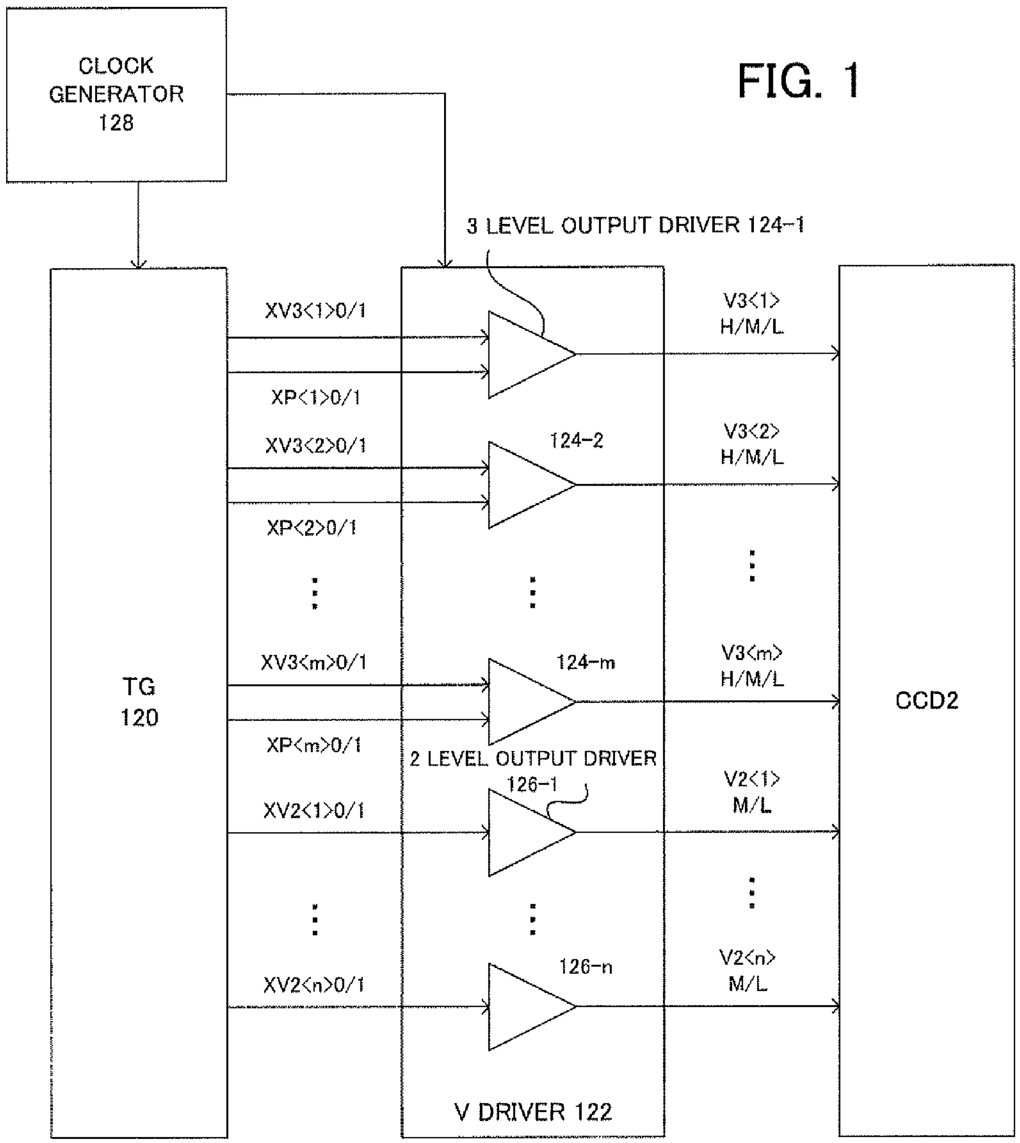
FIG. 1 is a diagram showing an example of a partial configuration of general image processing equipment.

FIG. 1 is a diagram showing an example of partial configuration of general image processing equipment 8 which may be a digital camera.

FIGS. 2A and 2B are diagrams showing relationships between input signals from a timing generator (TG) 120 shown in FIG. 1 and states of control signals outputted from a V driver 122 also shown in FIG. 1, FIG. 2A showing such relationships involving 3 level output drivers 124-1 to 124-*m* in the V driver 122 and FIG. 2B showing such relationships involving 2 level output drivers 126-1 to 126-*n* also in the V driver 122.

As shown in FIG. 1, the general image processing equipment 8 includes the TG 120, the V driver 122, a clock generator 128, and a CCD image sensor 2.

The V driver 122 includes the 3 level output drivers 124-1 to 124-*m*, wherein "m" represents a variable positive integer, and the 2 level output drivers 126-1 to 126-*n*, wherein "n" represents a variable positive integer.

In the following, unspecified one or more of the 3 level output drivers 124-1 to 124-*m* may be referred to simply as a "3 level output driver 124". In the accompanying drawings, identical or substantially identical components of the general image processing equipment 8 are denoted by the same reference numerals, respectively.

When two input control signals XV3<1> and XP<i> (1≤i m) are received from the TG 120, the 3 level output driver 124-*i* outputs an output control signal V3<i> in an output state determined by the input control signals.

The output state of an output control signal represents, for example, the voltage level of the output control signal.

For example, the output state of the output control signal V3<i> represents a low (L) level voltage (for example, −7 V), a medium (M) level voltage (for example, −1 to +1 V), or a high (H) level voltage (for example, +12 V).

Referring to FIG. 2A, when the values of the input control signals XV3<i> and XP<i> are, for example, 0 and 0, respectively, the 3 level output driver 124-*i* outputs the output control signal V3<i> of an H level voltage.

When an input control signal XV2<j> (1<j≤n) is received from the TG 120, the 2 level output driver 126-*j* outputs an output control signal V2<j> in an output state determined by the input control signal.

For example, the output states of the output control signals V2<1> to V2<n> each represent an L level voltage or an M level voltage.

Referring to FIG. 2B, when the value of the input control signal XV2<j> is, for example, 0, the 2 level output driver 126-*j* outputs the output control signal V2<j> of an M level.

The output control signals outputted from the 3 level output drivers 124 and 2 level output drivers 126 will hereinafter be referred to as the "3 level output control signals" and "2 level output control signals," respectively.

Also, in the following, the 3 level output control signals and 2 level output control signals may be collectively referred to simply as the "control signals."

The TG 120 outputs input control signals XV3<1> to XV3<m>, XP<1> to XP<m>, and XV2<1> to XV2<n> to the V driver 122 including the 3 level output drivers 124 and 2 level output drivers 126 at predetermined timings based on a clock signal generated by the clock generator 128.

The V driver 122 outputs 3 level output control signals V3<1> to V3<m> and 2 level output control signals V2<1> to V2<n> outputted by the 3 level output drivers 124 and 2 level output drivers 126, respectively, to the CCD image sensor 2 that may be a CCD imaging device or a CMOS imaging device at a predetermined timing based on the clock signal generated by the clock generator 128, thereby controlling the CCD image sensor 2.

The clock signal generated by the clock generator 128, on which the predetermined timing is based, can be used as a criterion for determining various periods.

In the above configuration of the general image processing equipment 8, to control the CCD image sensor 2, control signals are outputted from the TG 120 to the V driver 122 to be then inputted to the corresponding 3 level output drivers 124 and 2 level output drivers 126.

Therefore, when the number of the 3 level output drivers 124 and 2 level output drivers 126 required to control the CCD image sensor 2 increases, the number of control signals outputted from the TG 120 also increases, possibly making it necessary to make the TG 120 and V driver 122 larger.

The image pickup device control signal generating apparatus according to the present invention is designed to allow many signals for controlling an image pickup device to be generated using a small circuit.

First Embodiment

A first embodiment of the present invention will be described below.

[Digital Camera 1]

Figure 3:
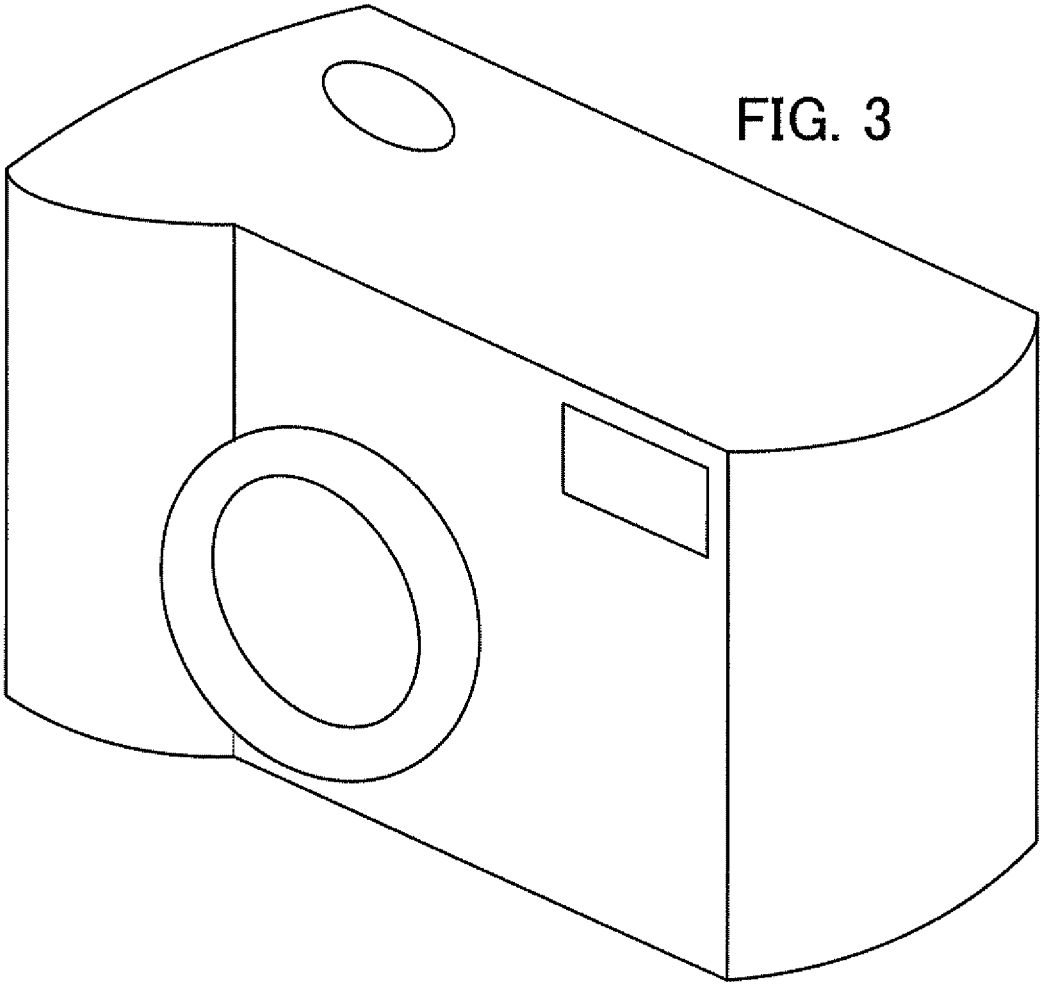
FIG. 3 is a diagram showing an example external view of a digital camera to which the present invention is applied.

FIG. 3 is a diagram showing an example external view of a digital camera 1 to which the present invention is applied.

Figure 4:
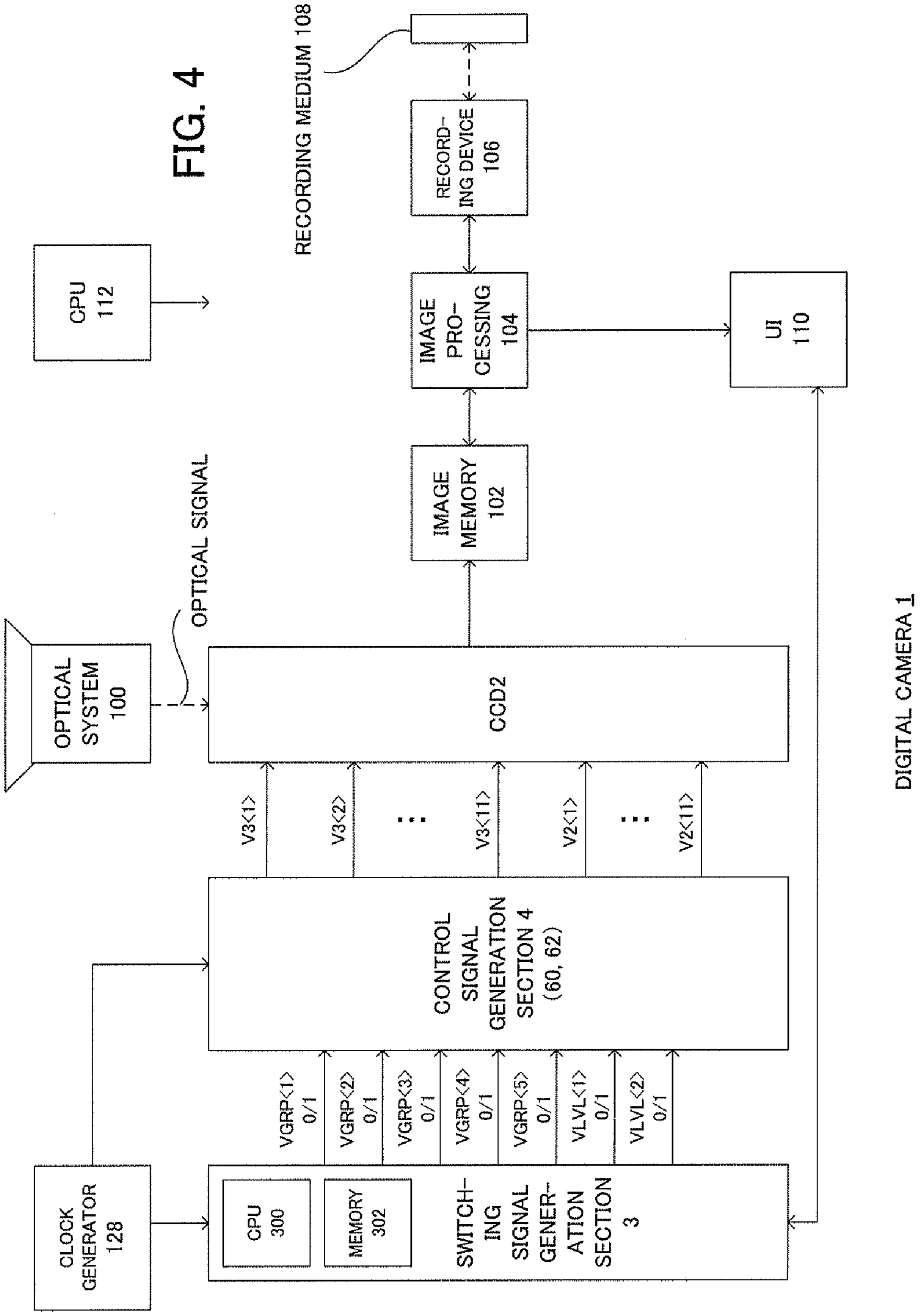
FIG. 4 is a diagram showing an example configuration of the digital camera shown in FIG. 3.

FIG. 4 is a diagram showing an example configuration of the digital camera 1 shown in FIG. 3.

As shown in FIG. 4, the digital camera 1 includes an optical system 100, a CCD image sensor 2, an image memory 102, an image processing section 104, a recording device 106, a recording medium 108, a user interface (UI) section 110, a CPU 112 to control various component sections of the digital camera 1, a clock generator 128, a switching signal generation section 3, and a control signal generation section 4.

The switching signal generation section 3 includes a CPU 300 and a memory 302.

The CCD image sensor 2 may be replaced by a different type of image pickup device, for example, a CMOS imaging device depending on the configuration of the digital camera 1.

Components of the digital camera 1 may be special-purpose hardware devices, or their functions may be realized using software to run on an operating system installed in the CPU 112 or in a digital signal processor (DSP).

Also, two or more arbitrarily selected components of the digital camera 1 may be configured in a unified structure, and any component of the digital camera 1 may be divided by function into two or more structures.

Furthermore, even through FIGS. 3 and 4 are drawn based on a case in which the present invention is applied to a digital still camera, the present invention can be applied to a different type of image processing equipment, for example, a digital video camera.

[CCD Image Sensor 2]

Figure 5:
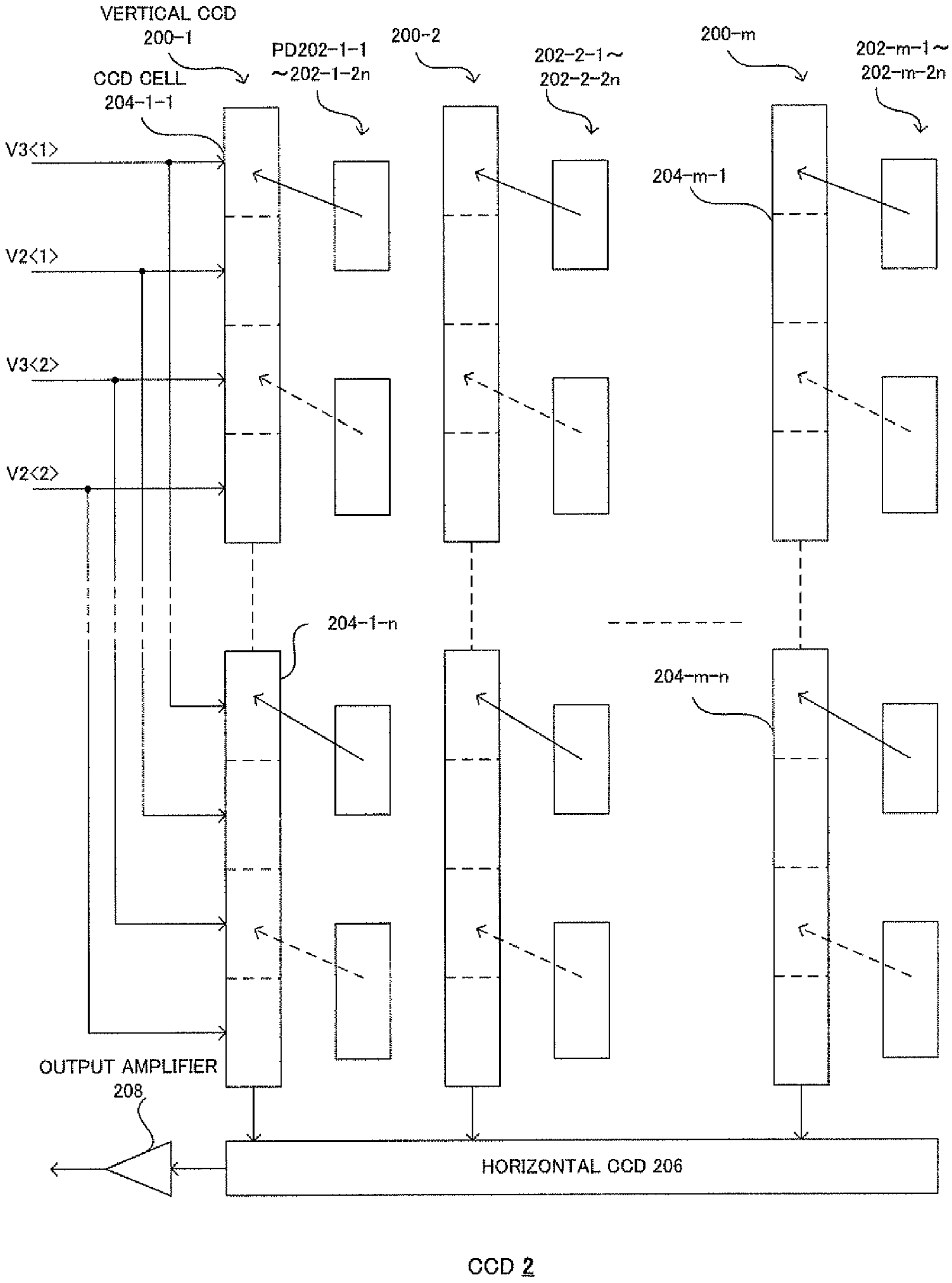
FIG. 5 is a diagram showing an example configuration of the CCD image sensor shown in FIG. 4.

FIG. 5 is a diagram showing an example configuration of the CCD image sensor 2 shown in FIG. 4.

The configuration shown in FIG. 5 is based on a case in which four control signals are inputted from the control signal generation section 4 to the CCD image sensor 2.

As shown in FIG. 5, the CCD image sensor 2 is of a frame reading type and includes vertical CCDs 200-1 to 200-*m* each having as many as n vertical CCD cells 204-*r*-*s* and as many as 2*n* photodiodes (PDs) 200-*r*-2*s*, a horizontal CCD 206, and an output amplifier 208, wherein "i", "j", "m", "n", "r", and "s" each represent a variable positive integer and satisfy the relationships: m≥i, r≥1, n≥j, and s≥1.

The CCD image sensor 2 having the components described above converts, using the PDs 202, optical signals representing an image of an object (not shown) formed by the optical system 100 on the imaging area of the CCD image sensor 2 into electrical signals.

The vertical CCDs 200 of the CCD image sensor 2 each receive 3 level output control signals V3<1> and V3<2>, and 2 level output control signals V2<1> and V2<2> from the control signal generation section 4; transfer charges of the PDs 202 to the horizontal CCD 206; and output the charges as image signals to the image memory 102 via the output amplifier 208.

In the CCD image sensor 2, the 3 level output control signals are used to read out the charges of the photodiodes and the 2 level output control signals are used to transfer the charges read out.

The image memory 102 (shown in FIG. 4) converts the image signals inputted from the CCD image sensor 2 into digital image data, stores the image data, and outputs the image data to the image processing section 104.

The image processing section 104 processes the image data inputted from the image memory 102, then outputs the processed image data to the recording device 106 and the UI section 110.

The recording device 106 records the image data inputted from the image processing section 104 to the recording medium 108 that may be a nonvolatile memory.

The recording device 106 also reads data recorded on the recording medium 108 and has the data stored in the image processing section 104.

The UI section 110 performs such operations as displaying an object image to be viewed by the user and reacting to depression of the shutter button.

[Switching Signal Generation Section 3]

The switching signal generation section 3 shown in FIG. 4 corresponds to the TG 120 shown in FIG. 1. It generates the following switching signals corresponding to the input signals received from the TG 120.

The CPU 300 in the switching signal generation section 3 generates, by executing a program stored in the memory 302 at a timing based on a clock signal generated by the clock generator 128, seven switching signals VGRP<1> to VGRP<5>, VLVL<1>, and VLVL<2> and outputs them to the control signal generation section 4.

Even though, in the example case shown in FIG. 4, the number of the switching signals is seven, the number may be arbitrarily changed depending on the configuration of the digital camera 1.

In the following, the VGRP<1> to VGRP<5> may be referred to as the "VGRPs<1:5>" and the VLVL<1> and VLVL<2> as the "VLVLs<1:2>."

As shown in FIG. 4, the VGRPs<1:5> generate signals each representing "0" or "1." The five signals generated by the VGRPs<1:5> make up 5-bit group identification information used to select a group.

A group includes a set of plural control signals out of the V3<1> to V3<11> and V2<1> to V2<11> whose output states such as voltage levels are changed at one time.

The correspondence between group identification information and plural control signals can be predefined, for example, as shown in Table 1 below.

TABLE 1

| Identification information | Group | Control signal |
|---|---|---|
| "00001" | G1 | V3<1>, V3<3> |
| "00010" | G2 | V3<2>, V2<1>, V2<4> |
| "00011" | G3 | V3<5> |
| . . . | . . . | . . . |
| "11111" | G31 | V3<3>, V3<10> |

For example, group identification information "00001" to "11111" corresponds to groups G1 to G31, respectively, as shown in Table 1.

Namely, when the switching signals VGRP<1> to VGRP<5> assume values "0," "0," "0," "0," and "1," respectively, they make up group identification information "00001" which corresponds to group G1.

As shown in Table 1, control signals V3<1> and V3<3> belong to group G1.

Namely, when group G1 is selected based on the VGRPs<1:5>, the output states of the control signals V3<1> and V3<3> are changed at one time.

Also, as shown in Table 1, control signals V3<2>, V2<1>, and V2<4> belong to group G2. Thus, a group may include both 3 level output control signals and 2 level output control signals.

Also, as shown in Table 1, control signal V3<3> belongs to both group G1 and group G31. Thus, a control signal may belong to plural groups.

Also, as shown in Table 1, group G3 includes only one control signal V3<5>. Thus, a group may be defined to change only one control signal.

As shown in FIG. 4, the VLVLs<1:2> generate signals, each representing "0" or "1," which are sequentially arranged to generate 2-bit output state information.

The output states of control signals, among the V3<1> to V3<11> and V2<1> to V2<11>, belonging to a group selected according to the VGRPs<1:5> are determined according to the output state information generated by the VLVLs<1:2>.

The output state information for the 3 level output control signals are defined, for example, by the following (1-1) to (1-3):

(1-1) Output state information "00" corresponds to an H level of a 3 level output control signal.

(1-2) Output state information "01" corresponds to an M level of a 3 level output control signal.

(1-3) Output state information "10" and "11" corresponds to an L level of a 3 level output control signal.

For the 2 level output control signals, there are only two output states, L level and M level. The output state information for the 2 level output control signals are defined, for example, by the following (2-1) to (2-2):

(2-1) Output state information "00" and "01" corresponds to an M level of a 2 level output control signal.

(2-2) Output state information "10" and "11" corresponds to an L level of a 2 level output control signal.

For example, when a group like group G2 listed in Table 1 to which a 3 level output control signal and 2 level output control signals belong is selected by the VGRPs<1:5> whereas output state information "00" is specified by the VLVLs<1:2>, the 3 level output control signal is outputted at an H level and the 2 level output control signals are outputted at an M level, respectively.

[First Control Signal Generation Section 4]

Figure 6:
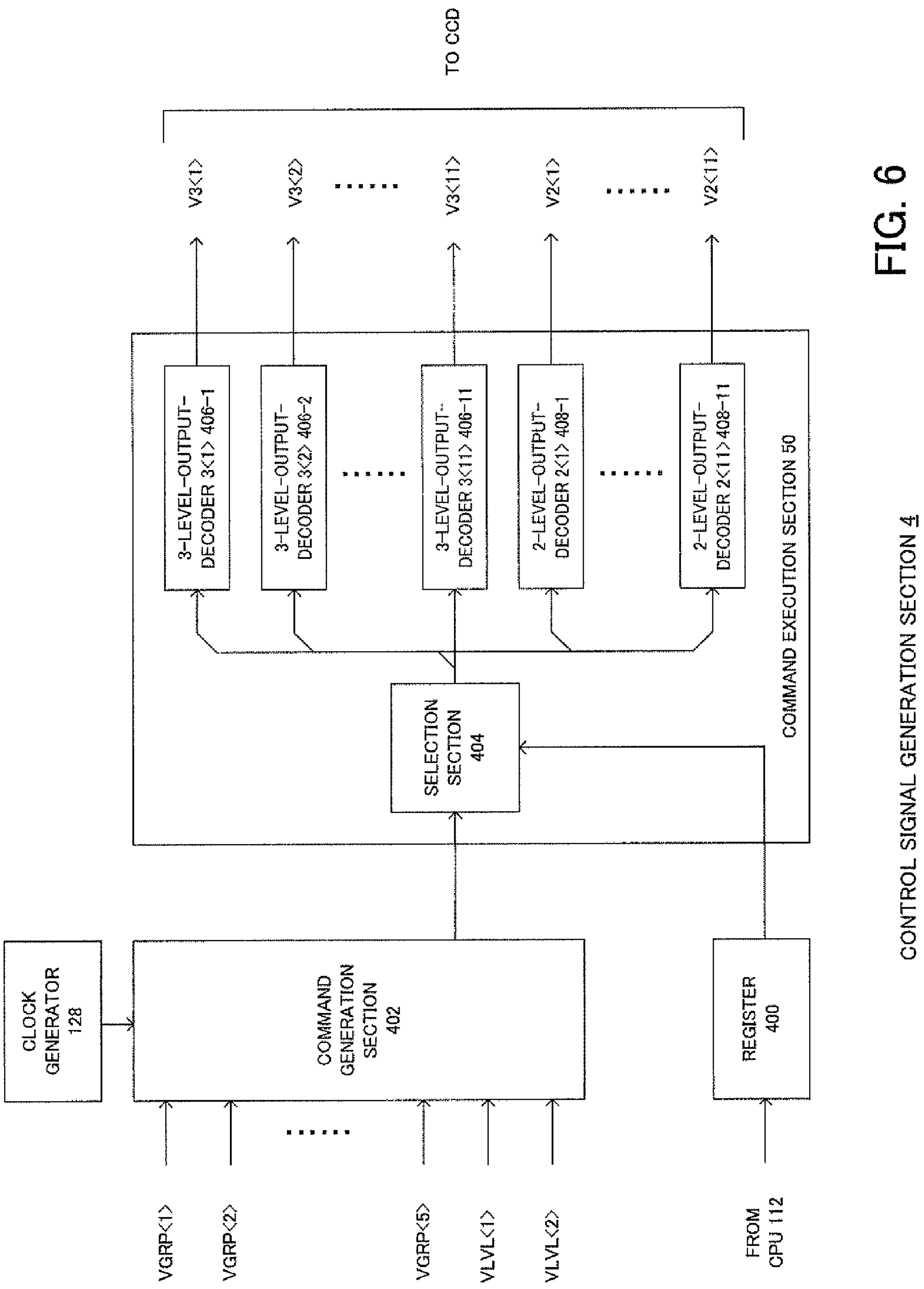
FIG. 6 is a diagram showing an example configuration of the first control signal generation section shown in FIG. 4.

FIG. 6 is a diagram showing the configuration of the first control signal generation section 4 and the clock generator 128 shown in FIG. 4.

Figure 7:
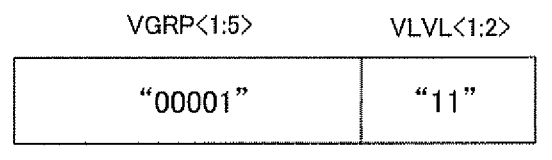

FIG. 7 is a diagram showing an example of a switching command generated by a command generation section 402 shown in FIG. 6.

As shown in FIG. 6, the first control signal generation section 4 includes a first register 400, the command generation section 402, and a first command execution section 50.

The first command execution section 50 includes a first selection section 404, 3-level-output-decoders 406-1 to 406-*m*, and 2-level-output-decoders 408-1 to 408-*n*, wherein "m" and "n" are the same as the numbers of 3 level output control signals and 2 level output control signals outputted to the CCD image sensor 2, respectively.

The drawings referred to in the following are based on a case where "m"=11 and "n"=11.

The first register 400 includes 22 registers R3<1> to R3<11> and R2<1> to R2<11> (not shown) corresponding to the control signals V3<1> to V3<11> and V2<1> to V2<11>.

The values stored in the registers R3<1> to R3<11> and R2<1> to R2<11> in the first register 400 represent group identification information indicating the groups to which the control signals V3<1> to V3<11> and V2<1> to V2<11> belong, respectively. The values are outputted, under the control of the CPU 112 (shown in FIG. 4), to the first command execution section 50.

For example, the value stored in the register R3<1> corresponding to the control signal V3<1> belonging to group G1 is "00001," the value stored in the register R2<1> corresponding to the control signal V2<1> belonging to group G2 is "00010," and the values stored in the register R3<3> corresponding to the control signal V3<3> belonging to groups G1 and G31 are "00001" and "11111."

The command generation section 402 generates a switching command based on the VGRPs<1:5> and VLVLs<1:2> inputted from the switching signal generation section 3.

The switching command generated by the command generation section 402 is outputted to the first command execution section 50 at a prescribed timing based on a clock signal generated by the clock generator 128.

As shown in FIG. 7, a switching command includes, for example, group identification information generated from the VGRPs<1:5> and output state information generated from the VLVLs<1:2>.

The 3-level-output-decoders 406-1 to 406-11 (shown in FIG. 6) output the 3 level output control signals V3<1> to V3<11> in an output state of an L level, M level, or H level to the CCD image sensor 2, respectively.

When output state information in a switching command is received from the first selection section 404, the 3-level-output-decoder 406-*i* (1≤i≤11) outputs the 3 level output control signal V3<i> after switching its output state to the one corresponding to the received output state information.

Unless such output state information is inputted, the 3-level-output-decoder 406-*p* (1≤p≤11, p≠i) outputs the 3 level output control signal V3<p> without switching its output state.

The 2-level-output-decoders 408-1 to 408-11 output the 2 level output control signals V2<1> to V2<11> in an output state of an L level or M level to the CCD image sensor 2, respectively.

When output state information in a switching command is received from the first selection section 404, the 2-level-output-decoder 408-*j* (1≤j≤11) outputs the 2 level output control signal V2<j> after switching its output state to the one corresponding to the received output state information.

Unless such output state information is inputted, the 2-level-output-decoder 408-*q* (1≤q≤11, q≠j) outputs the 2 level output control signal V2<q> without switching its output state.

In the following, the 3-level-output-decoders 406 and 2-level-output-decoders 408 may be collectively referred to as the "decoders."

The first selection section 404 selects control signals whose output states are to be switched according to the register values inputted from the first register 400 and the switching command inputted from the command generation section 402.

For example, the first selection section 404 determines whether or not the values stored in the registers R3<1> to R3<11> and R2<1> to R2<11> match the group identification information in the switching command.

When the value stored in any of the registers matches the group identification information, the first selection section 404 outputs the output state information given by the switching command to the decoders that generate the control signals corresponding to the registers.

[Example Operation of Switching Signal Generation Section 3 and First Control Signal Generation Section 4]

An example of overall operation of the switching signal generation section 3 and first control signal generation section 4 shown in FIG. 4 will be described below.

The switching signal generation section 3 (shown in FIG. 4) executes a program stored in the memory 302 and outputs a switching signal to the first control signal generation section 4.

The command generation section 402 (shown in FIG. 6) of the first control signal generation section 4 receives a switching signal from the switching signal generation section 3 (shown in FIG. 4) and generates a switching command (shown in FIG. 7) including group identification information and output state information.

The first selection section 404 (shown in FIG. 6) receives the register values inputted from the first register 400 and the switching command (shown in FIG. 7) inputted from the command generation section 402, and selects control signals whose output states are to be switched according to the register values and the group identification information given by the switching command.

The first selection section 404 outputs the output state information given by the switching command to the 3-level-output-decoders 406 and 2-level-output-decoders 408 corresponding to the selected control signals.

The decoders that have received the output state information in the switching command from the first selection section 404 output the corresponding control signals after switching their output states according to the received output state information.

The other decoders output the corresponding control signals without changing their output states.

Second Embodiment

A second embodiment of the present invention will be described below.

Figure 8:
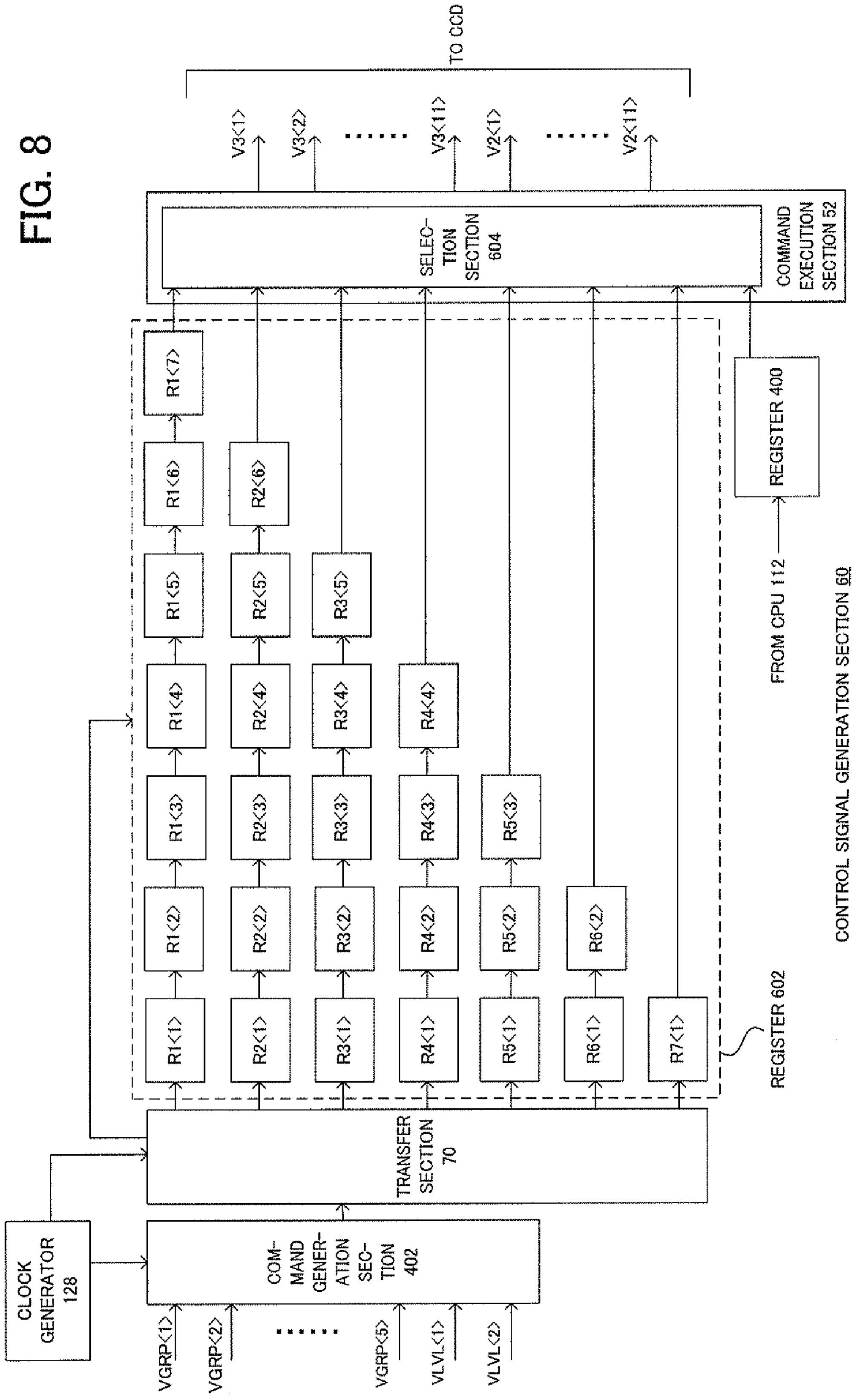
FIG. 8 is a diagram showing an example configuration of a second control signal generation section which, in the digital camera shown in FIGS. 3 and 4, replaces the first control signal generation section.

FIG. 8 is a diagram showing the configuration of a second control signal generation section 60 which, in the digital cameral shown in FIGS. 3 and 4, replaces the first control signal generation section 4, and the clock generator 128.

As shown in FIG. 8, the second control signal generation section 60 includes a second command execution section 52 instead of the first command execution section 50 in the first control signal generation section 4, and additionally includes a first transfer section 70 and a second register 602.

The second command execution section 52 includes 3-level-output-decoders 406 and 2-level-output-decoders 408 (neither shown) similar to those shown in FIG. 6, and also a second selection section 604.

In the second embodiment, the second control signal generation section 60 outputs, at one time (at a same clock pulse), plural control signals selected according to plural switching signals successively inputted from the switching signal generation section 3 (shown in FIG. 4) after switching their output states as specified by the respective switching signals.

Even though the following description of the second embodiment is based on a case in which the maximum number of switching signals (hereinafter referred to as the “switching signals to be synchronized”) that the second control signal generation section 60 receives to output plural control signals after switching their output states at one time is seven, the maximum number may be arbitrarily changed according to the configuration of the digital camera 1.

When the number of switching signals to be synchronized is smaller than seven, the last one of the switching signals to be synchronized is followed by a special delimiting switching signal (hereinafter also referred to as a “delimiter signal”).

A delimiter delimits a group of switching signals to be synchronized at one time from the next group of switching signals to be synchronized at another time. When, for example, three switching signals to be synchronized are followed by a delimiter, the three switching signals are synchronized at one time, and the switching signals following the delimiter are synchronized at another time.

The second register 602 includes registers R1<1> to R1<r>, R2<1> to R2<r−1>, . . . , R(r−1)<1>, R(r−1)<2>, and R(r)<1>.

In the example case shown in FIG. 8, “r” is assumed to be seven (i.e. “r”=7) with the second register 602 including registers R1<1> to R1<7>, R2<1> to R2<6>, R3<1> to R3<5>, R4<1> to R4<4>, R5<1> to R5<3>, R6<1>, R6<2>, and R7<1>.

In the following description: each register to which a switching command is inputted directly from the first transfer section 70 may be referred to as a “top register,” each register from which a switching command is outputted directly to the second command execution section 52 may be referred to as a “terminal register,” and the other registers may each be referred to as an “intermediate register.”

To be concrete, in the configuration shown in FIG. 8, the registers R1<1> to R6<1> are top registers, the registers R1<7>, R2<6>, R3<5>, R4<4>, R5<3>, and R6<2> are terminal registers, and the register R7<1> is a top register and, at the same time, a terminal register.

Also, in the following description, registers shown horizontally aligned may be referred to as “registers in a row” (for example, the register R1<1> to R1<7> are registers in a row), and registers shown vertically aligned may be referred to as “registers in a column” (for example, the registers R1<1> to R7<1> are registers in a column).

When switching commands are inputted from the command generation section 402, the first transfer section 70 determines to which top registers to output the switching commands, respectively, and outputs the switching commands to the top registers thus determined (being described in detail with reference to FIG. 9).

The first transfer section 70 has, by controlling the top registers and intermediate registers in the second register 602, the switching command held in each register in each row outputted to the right adjacent register within each row.

The first transfer section 70 also has, by controlling the terminal registers in the second register 602, the switching command held in the terminal register of each row outputted to the second command execution section 52.

In the following description, the operation in which the switching command held in each register in each row of the second register 602 is outputted to the right adjacent register will be referred to as “rightward shifting.”

The first transfer section 70 outputs switching commands and shifts them rightward as described above at every pulse of the clock signal generated by the clock generator 128.

The value stored in each register in the second register 602 is initialized by having an initial value (for example, “0”) held in the register.

When an initial value of a register is inputted to the second command execution section 52, the second command execution section 52 does not execute any operation.

The top register of each row of the second register 602 holds the switching command inputted from the transfer section 70.

Each of the intermediate registers and terminal registers in the second register 602 holds a switching command inputted to it from the left adjacent register in the same row by rightward shifting performed by the first transfer section 70.

The second selection section 604 of the second command execution section 52 receives each register value inputted from the second register 602 and plural switching commands inputted from the terminal registers of the second register 602.

The second selection section 604 selects, according to the inputted switching commands and in a manner similar to the one used by the first selection section 404 (shown in FIG. 6), the control signals whose output states are to be switched.

Even though there are cases in which a control signal belongs to plural groups, such plural groups are for selection in plural control modes (for example, still image mode and monitor mode) of the CCD image sensor 2 (shown in FIGS. 4 and 5), so that there are no cases where two or more of the plural groups are selected by plural switching commands at one time.

[Operation of First Transfer Section 70]

Figure 9:
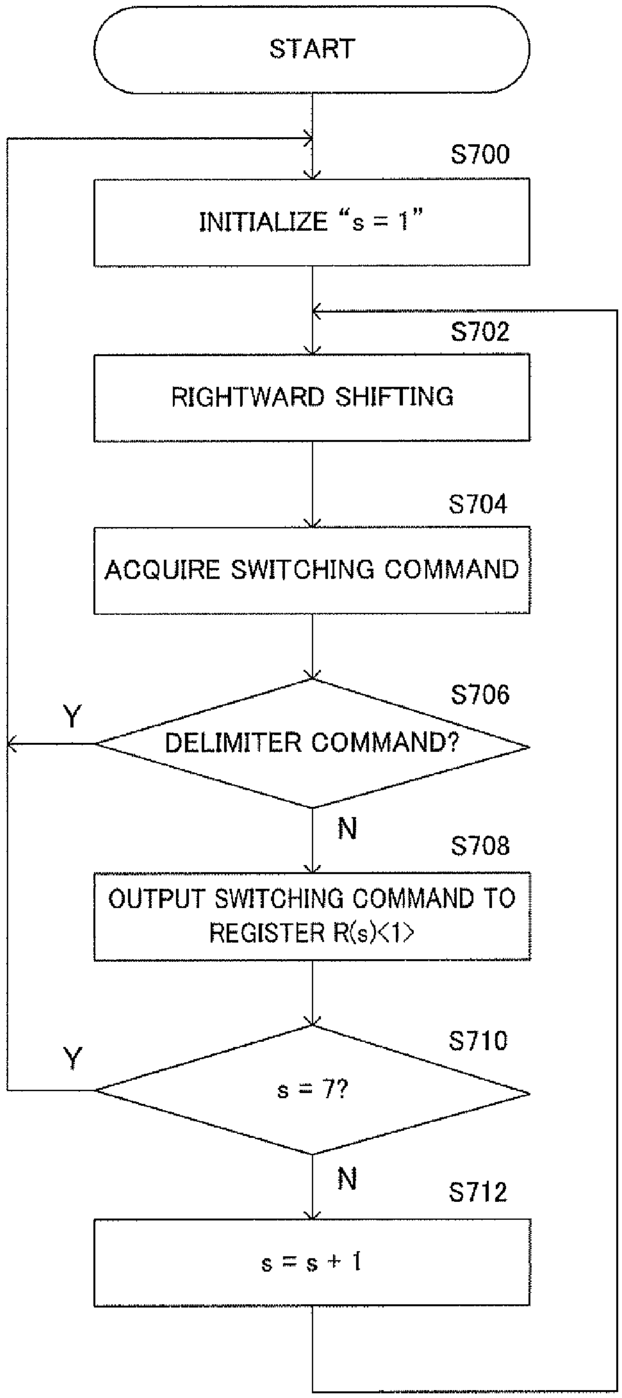
FIG. 9 is a flowchart of processing performed by the first transfer section shown in FIG. 8.

FIG. 9 is a flowchart of processing performed by the first transfer section 70 shown in FIG. 8. The processing performed by the first transfer section 70 will be described in detail below with reference to FIG. 9.

In step 700 (S700), the first transfer section 70 initializes the value of “s” representing an internally stored row number of the second register 602 (shown in FIG. 8) to 1.

When “s”=1, for example, it corresponds to the register R1<1>.

In step 702 (S702), the first transfer section 70 performs the rightward shifting for each register in the second register 602.

In step 704 (S704), the first transfer section 70 acquires a switching command inputted from the command generation section 402.

In step 706 (S706), the first transfer section 70 determines whether or not the switching command acquired in S704 is a delimiter command.

A delimiter command is a command generated from a delimiter signal. It represents a 5-bit string, for example, “00000” given by the VGRP<1:5>.

When, in S706, it is determined that the switching command is a delimiter command, processing returns to S700; otherwise processing advances to step 708 (S708).

In S708, the first transfer section 70 outputs the switching command acquired in S704 to the top register R(s)<1>.

In step 710 (S710), the first transfer section 70 determines whether or not the value of “s” is 7.

When, in S710, it is determined that the value of “s” is 7, processing returns to S700; otherwise, processing advances to step 712 (S712).

In S712, the first transfer section 70 increments the value of “s” by 1, then processing returns to S702.

The first transfer section 70 performs the processing starting from S700 or S702 at every clock pulse.

[Example Operation of Switching Signal Generation Section 3 and Second Control Signal Generation Section 60]

Figure 10:
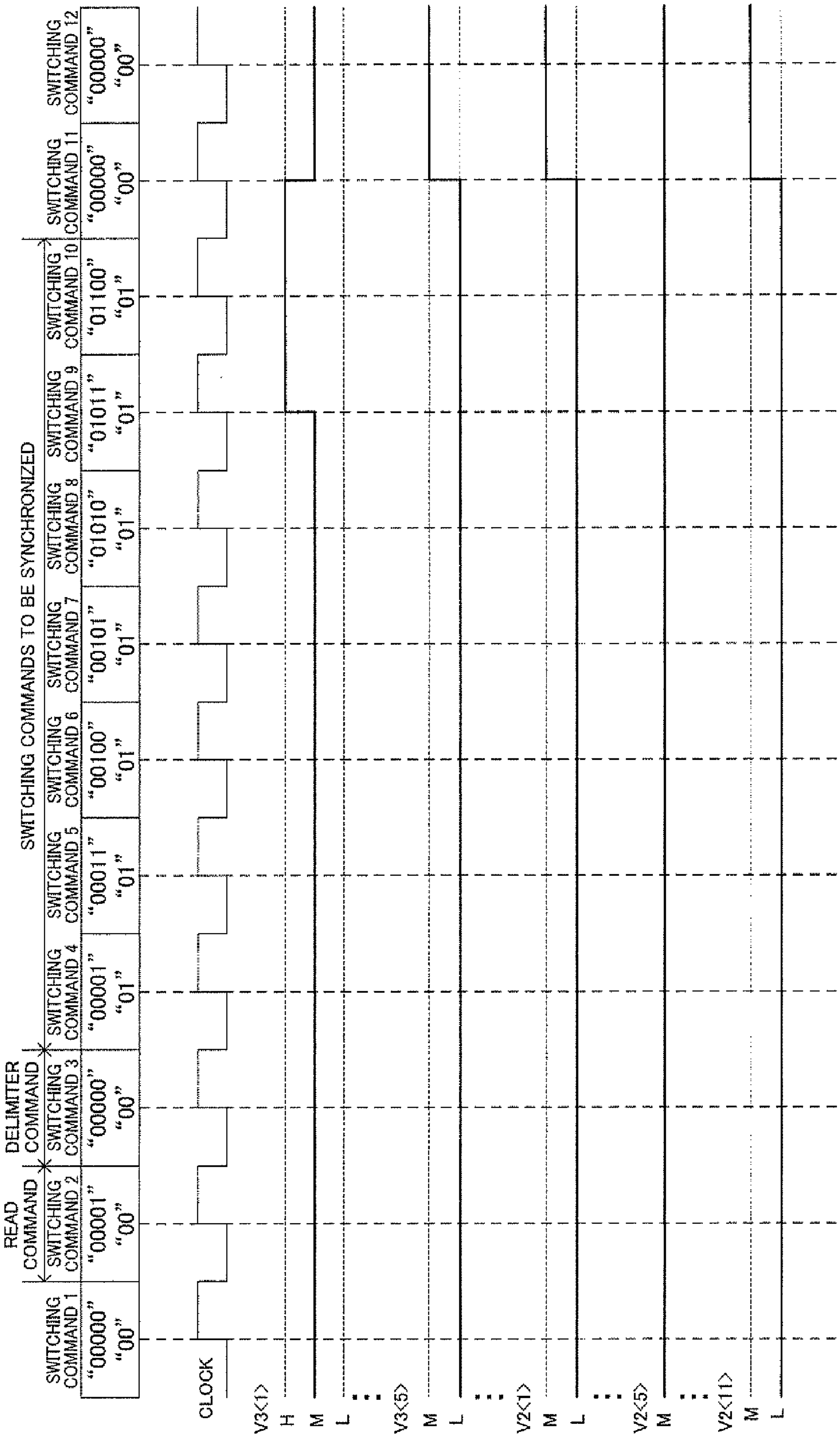
FIG. 10 is a diagram showing example generation of control signals based on switching signals outputted from the switching signal generation section shown in FIG. 4.

FIG. 10 is a diagram showing example generation of control signals based on switching signals outputted from the switching signal generation section 3 (shown in FIG. 4).

An example of overall operation of the switching signal generation section 3 and second control signal generation section 60 will be described below with reference to FIG. 10.

The switching signal generation section 3 (shown in FIG. 4) executes a program stored in the memory 302 and outputs a switching signal to the second control signal generation section 60 (shown in FIG. 8) at every clock pulse.

In the example case shown in FIG. 10, for example, the switching signal generation section 3 outputs a switching signal to the second control signal generation section 60 at each of 12 clock pulses.

The second control signal generation section 60 operates according to plural switching signals inputted from the switching signal generation section 3 (shown in FIG. 4) as follows.

When a first switching signal is received, the command generation section 402 (shown in FIG. 8) generates a first switching command including group identification information "00000" (i.e. a delimiter command) and output state information "00".

In the following description, the nth switching signal and the nth switching command will be referred to as "switching signal n" and "switching command n", respectively (wherein "n" is a positive integer).

The first transfer section 70 (shown in FIG. 8) performs the rightward shifting for each register in the second register 602.

Switching command 1 being a delimiter command is not outputted to the register R1<1> in the second register 602.

When switching signal 2 is received, the command generation section 402 generates switching command 2 including group identification information "00001" and output state information "00".

The first transfer section 70 performs the rightward shifting for each register in the second register 602.

The first transfer section 70 outputs switching command 2 acquired from the command generation section 402 to the register R1<1>.

When switching signal 3 is received, the command generation section 402 generates switching command 3 including group identification information "00000" (i.e. a delimiter command) and output state information "00".

The first transfer section 70 performs the rightward shifting for each register in the second register 602.

As a result, switching command 2 is held in the register R1<2>.

Switching command 3 being a delimiter command is not outputted to the register R2<1> in the second register 602.

When switching signal 4 is received, the command generation section 402 generates switching command 4 including group identification information "00001" and output state information "01."

The first transfer section 70 performs the rightward shifting for each register in the second register 602.

As a result, switching command 2 is held in the register R1<3>.

The first transfer section 70 outputs switching command 4 acquired from the command generation section 402 to the register R1<1>.

When switching signal 5 is received, the command generation section 402 generates switching command 5 including group identification information "00011" and output state information "01."

The first transfer section 70 performs the rightward shifting for each register in the second register 602.

As a result, switching commands 2 and 4 are held in the registers R1<4> and R1<2>, respectively.

The first transfer section 70 outputs switching command 5 to the register R2<1>.

When the command generation section 402 receives switching signals 6 to 8 and operates similarly to the manner described above, switching command 2 is held in the terminal register R1<7>.

When the rightward shifting is performed at the next clock pulse (the clock pulse at which the command generation section 402 receives switching signal 9) for each register in the second register 602, switching command 2 held in the register R1<7> is outputted to the second command execution section 52 (shown in FIG. 8).

As shown in FIG. 10, the second command execution section 52 outputs, by executing switching command 2, the control signal (for example, V3<1>) belonging to the group (for example, group G1) indicated by group identification signal "00001" in an H-level output state.

When the command generation section 402 (shown in FIG. 8) receives switching signals 9 and 10 and operates similarly to the manner described above, switching commands 4 to 10 are held in the terminal registers R1<7>, R2<6>, . . . , R7<1>, respectively.

At the next clock pulse (the clock pulse at which the command generation section 402 receives switching signal 11), switching commands 4 to 10 held in the registers R1<7>, R2<6>, . . . , R7<1>, respectively, are outputted to the second command execution section 52 (shown in FIG. 8).

As shown in FIG. 10, the second command execution section 52 outputs, by executing switching commands 4 to 10, the control signals (for example, V3<5>, V2<1>, and V2<11>) belonging to the groups (for example, groups G1, G3 to G5, and G9 to G11) indicated by group identification signals "00001," "00011," "00100," "00101," "01010," "01011," and "01100" in an M-level output state.

When switching signals 11 and 12 are received, the command generation section 402 operates similarly to the manner described above.

Third Embodiment

A third embodiment of the present invention will be described below.

Figure 11:
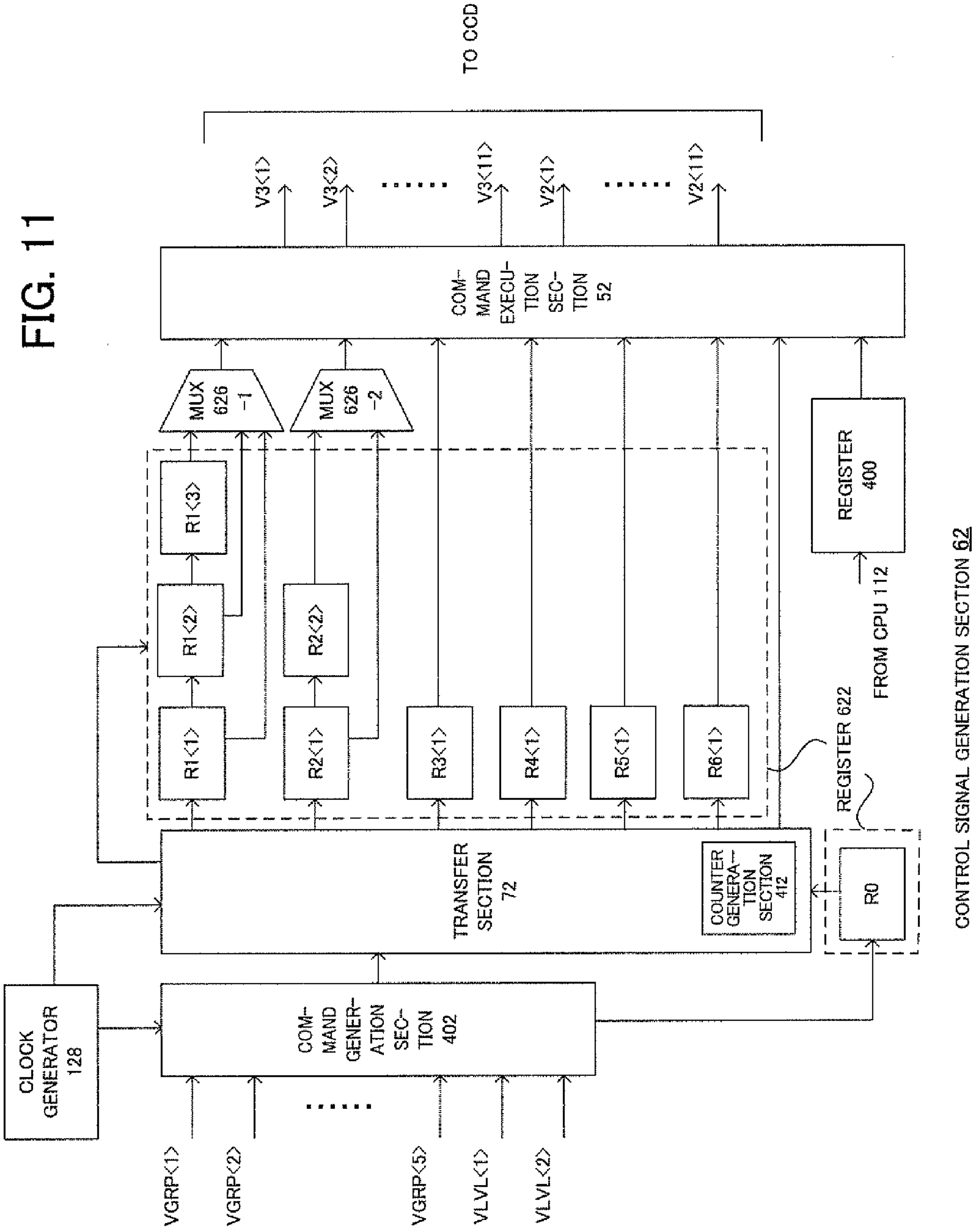
FIG. 11 is a diagram showing an example configuration of a third control signal generation section replacing the second control signal generation section shown in FIG. 8.

FIG. 11 is a diagram showing the configuration of a third control signal generation section 62 replacing the second control signal generation section 60 shown in FIG. 8 and the clock generator 128.

As shown in FIG. 11, the third control signal generation section 62 includes a second transfer section 72 and a third register 622 instead of the first transfer section 70 and the second register 602 in the second control signal generation section 60, and additionally includes multiplexers (MUXs) 626-1 and 626-2.

The second transfer section 72 includes a counter generation section 412.

The third register 622 includes, for example, as shown in FIG. 11, registers R0, R1<1> to R1<3>, R2<1>, R2<2>, R3<1>, R4<1>, R5<1>, and R6<1>.

The value stored in each register in the third register 622 is initialized by having an initial value (for example, "0") held in the register.

The register R0 holds a switching command inputted from the command generation section 402.

When switching commands or initial values held in the registers R1<1> to R1<3> are received, the MUX 626-1 outputs, to the second command execution section 52, the switching command held in the register with the largest column number among the registers that have each inputted a switching command to the MUX 626-1.

When none of the registers R1<1> to R1<3> holds a switching command, the MUX 626-1 outputs their initial value to the second command execution section 52.

When switching commands or initial values held in the registers R2<1> and R2<2> are received, the MUX 626-2 outputs, to the second command execution section 52, the switching command held in one of the registers R2<1> and R2<2> which has inputted a switching command to the MUX 626-2 and whose column number is larger than that of the other one also holding a switching command.

When neither of the registers R2<1> and R2<2> holds a switching command, the MUX 626-2 outputs their initial value to the second command execution section 52.

The second transfer section 72 receives commands generated by the command generation section 402 via the register R0.

The counter generation section 412 in the second transfer section 72 generates a counter and holds a count in it. Based on the count held in the counter, the time when the second transfer section 72 outputs switching commands or initial values held in the third register 622 to the MUXs 626-1 and 626-2 and the second command execution section 52 is determined.

The count is, for example, an integer between 1 and 7. Its initial value is 1 which is incremented by 1 at every pulse of the clock signal generated by the clock generator 128 (shown in FIG. 11).

When, with the count having reached 7, the second transfer section 72 outputs a switching command or an initial value held in the third register 622 to the second command execution section 52, the counter disappears.

The counter generation section 412 can generate plural counters. In the following description, plural counters may be numbered in the order of generation and referred to as counter 1, counter 2, . . . , counter n ("n" being a positive integer).

[Operation of Second Transfer Section 72]

Figure 12:
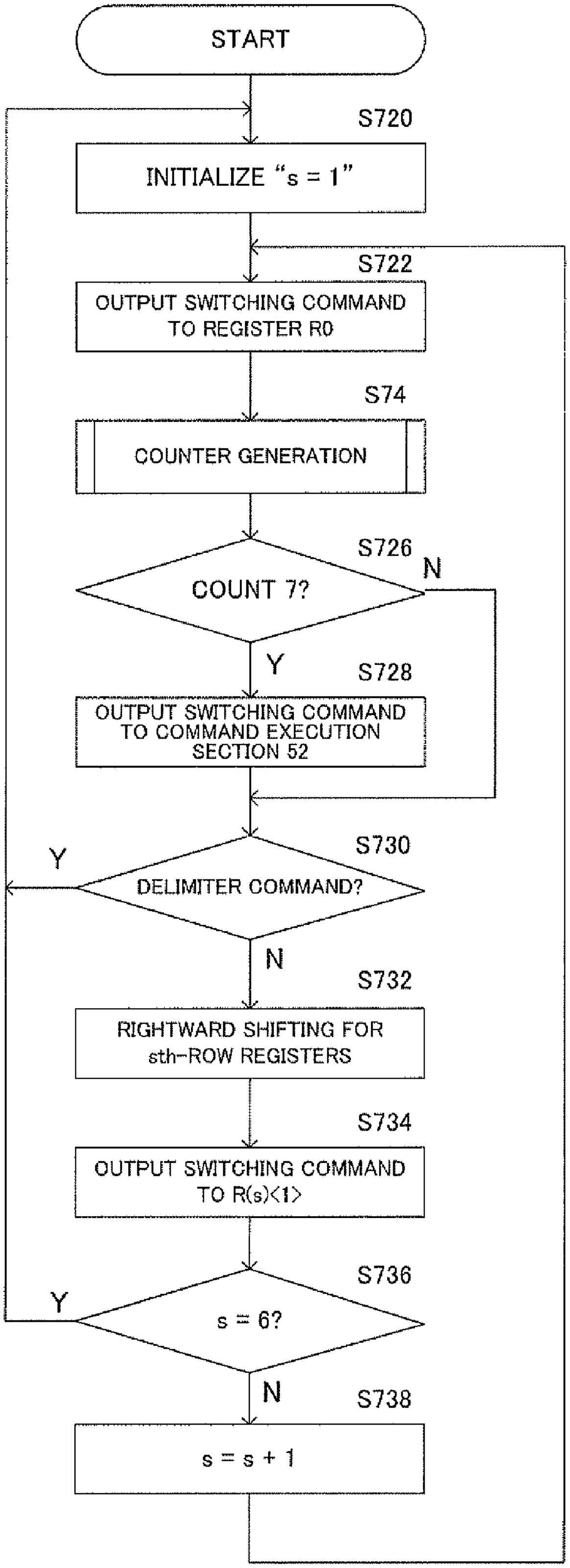
FIG. 12 is a flowchart of processing performed by the second transfer section shown in FIG. 11.

FIG. 12 is a flowchart of processing performed by the second transfer section 72 shown in FIG. 11.

The processing performed by the second transfer section 72 will be described in detail below with reference to FIG. 12.

In step 720 (S720), the value of "s" representing an internally stored row number of the third register 622 (shown in FIG. 11) is initialized to 1.

In step 722 (S722), the second transfer section 72 stores a switching command inputted from the command generation section 402 (shown in FIG. 11) in the register R0.

In step 74 (S74), the counter generation section 412 of the second transfer section 72 generates a counter as required (being described later with reference to FIG. 13).

In step 726 (S726), the second transfer section 72 determines whether or not there is any counter holding a count of 7.

When it is determined in S726 that there is a counter holding a count of 7, processing advances to step 728 (S728); otherwise processing advances to step 730 (S730).

In S728, the second transfer section 72 outputs a switching command or an initial value out of the following (3-1) to (3-3) to the second command execution section 52.

(3-1) A switching command or an initial value selected by outputting switching commands held in the registers R1<1> to R1<3> or their initial value to the MUX 626-1.

(3-2) A switching command or an initial value selected by outputting switching commands held in the registers R2<1> and R2<2> or their initial value to the MUX 626-2.

(3-3) A switching command held in the registers R0 and R3<1> to R6<1> or their initial value.

In S730, the second transfer section 72 determines whether or not the switching command stored in the register R0 in S722 is a delimiter command.

When it is determined in S730 that the switching command is a delimiter command, processing returns to S720; otherwise processing advances to step 732 (S732).

In S732, the rightward shifting is performed for each register in the sth row, excluding the third to sixth rows, of the third register 622 (shown in FIG. 11). The third to sixth rows each including only one register are not subjected to the rightward shifting.

In step 734 (S734), the second transfer section 72 outputs the switching command stored in the register R0 in S722 to the top register R(s)<1>.

In step 736 (S736), the second transfer section 72 determines whether or not the value of "s" is 6.

When it is determined in S736 that the value of "s" is 6, processing returns to S720; otherwise processing advances to step 738 (S738).

In S738, the second transfer section 72 increments the value of "s" by 1, and processing returns to S722.

[Counter Generation Process]

Figure 13:
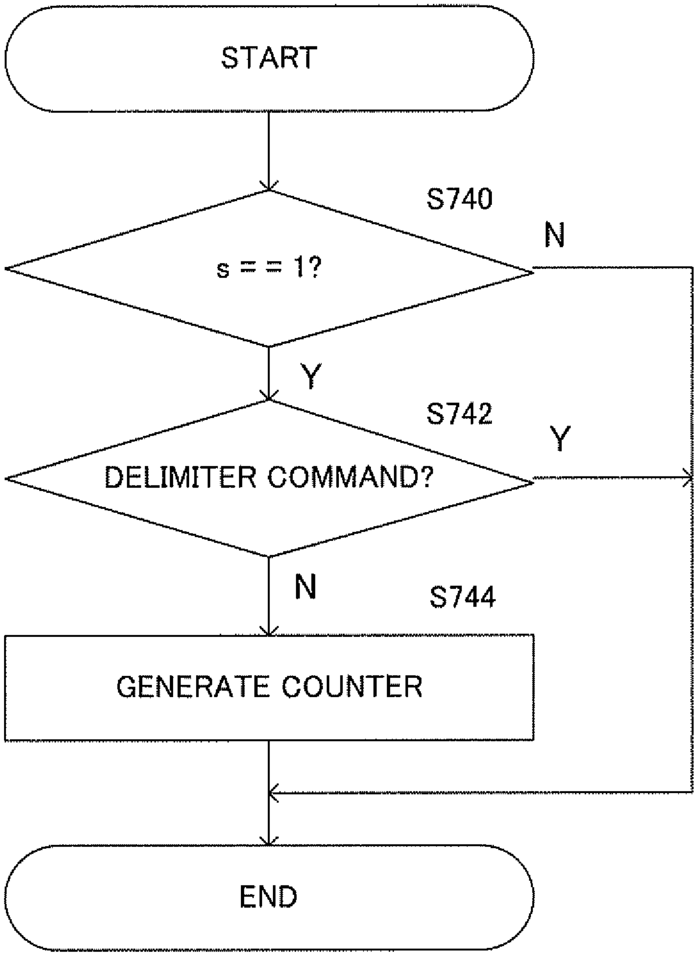
FIG. 13 is a flowchart of the counter generation process shown in FIG. 12.

FIG. 13 is a flowchart of the counter generation process performed in S74 shown in FIG. 12.

In the counter generation process, the counter generation section 412 (shown in FIG. 11) generates a new counter when the second transfer section 72 outputs a switching command which is not a delimiter command to the register R1<1> (shown in FIG. 11) in the third register 622.

The counter generation process will be further described below with reference to FIG. 13.

As shown in FIG. 13, the counter generation section 412 (shown in FIG. 11) in the second transfer section 72 determines, in step 740 (S740), whether or not the value of "s" is 1.

When it is determined in S740 that the value of "s" is 1, processing advances to step 742 (S742); otherwise processing is terminated.

In S742, the counter generation section 412 determines whether or not the switching command is a delimiter command.

When it is determined in S742 that the switching command is a delimiter command, processing is terminated; otherwise processing advances to step 744 (S744).

In S744, the counter generation section 412 generates a counter and terminates processing.

[Example Operations of Third Control Signal Generation Section 62]

Figure 14:
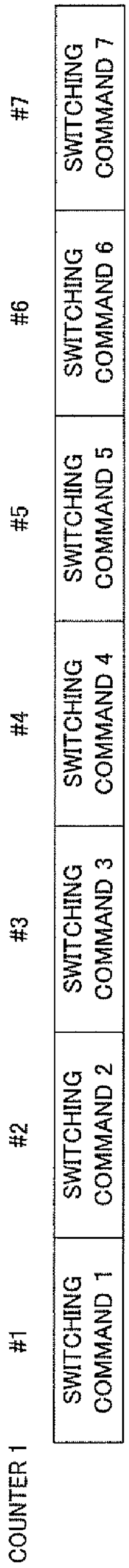
FIG. 14 is a diagram showing an example string of seven switching commands generated by the command generation section shown in FIG. 11.

FIG. 14 is a diagram showing an example string of seven switching commands, without any delimiter, generated by the command generation section 402 of the third control signal generation section 62 (shown in FIG. 11) according to switching signals successively inputted from the switching signal generation section 3 (shown in FIG. 4).

FIG. 15 is a diagram showing an example string of eight switching commands every other one of which is a delimiter and which have been generated by the command generation section 402 of the third control signal generation section 62 according to switching signals successively inputted from the switching signal generation section 3 and also showing example states at different clock pulses of the registers R1<1> to R1<3>, R2<1>, R2<2>, and R3<1> in the third register 622 holding switching commands.

FIG. 16 is a diagram showing an example string of 11 switching commands, including delimiters, generated by the command generation section 402 of the third control signal generation section 62 according to switching signals successively inputted from the switching signal generation section 3 and also showing example states at different clock pulses of the registers R1<1> to R1<3>, R2<1>, R2<2>, and R3<1> in the third register 622 holding switching commands.

First to third example operations of the third control signal generation section 62 performed for the switching command strings shown in FIGS. 14 to 16 will be described below.

[First Example Operation]

A first example operation of the third control signal generation section 62 performed for the switching command string shown in FIG. 14 will be described below.

The command generation section 402 (shown in FIG. 11) outputs switching command 1 to the register R0 in the third register 622.

Since switching command 1 is to be outputted to the register R1<1> and it is not a delimiter command, the counter generation section 412 generates counter 1.

The second transfer section 72 performs the rightward shifting for the registers R1<1> to R1<3>.

The second transfer section 72 receives switching command 1 held in the register R0 and outputs it to the register R1<1> in the third register 622.

The command generation section 402 outputs switching commands 2 to 6 to the register R0 in the third register 622 at counts 2 to 6 (#2 to #6) of counter 1, respectively.

At counts #2 to #6 of counter 1, the second transfer section 72 receives switching commands 2 to 6, respectively, from the register R0 and proceeds similarly to the manner as at count #1, so that, when its operation at count #6 is finished, switching commands 2 to 6 are held in the registers R2<1> to R6<1>, respectively.

At count #7 of counter 1, the second transfer section 72 outputs, to the MUX 626-1, switching command 1 held in the register R1<1> and the initial values held in the registers R1<2> and R1<3>, all of which are in the third register 622.

Also at count #7 of counter 1, the second transfer section 72 outputs switching command 2 held in the register R2<1> and the initial value held in the register R2<2> to the MUX 626-2.

Namely, switching command 1 held in the register R1<1> and switching command 2 held in the register R2<1> are outputted to the second command execution section 52 via the MUXs 626-1 and 626-2.

Also, at count #7 of counter 1, the second transfer section 72 outputs switching commands 3 to 7 held in the registers R3<1> to R6<1>, and R0 to the second command execution section 52.

The second command execution section 52 sets the control signals belonging to the groups specified by the group identification information in switching commands 1 to 7 to the output states specified by the output state information in the switching commands and outputs the control signals at one time.

[Second Example Operation]

A second example operation of the third control signal generation section 62 performed for the switching command string shown in FIG. 15 will be described below.

The command generation section 402 (shown in FIG. 11) outputs switching command 1-1 to the register R0 in the third register 622.

Since switching command 1-1 is to be outputted to the register R1<1> and it is not a delimiter command, the counter generation section 412 generates counter 1.

The second transfer section 72 performs the rightward shifting for the registers R1<1> to R1<3> in the third register 622.

The second transfer section 72 receives switching command 1-1 held in the register R0 and outputs it to the register R1<1> in the third register 622.

The command generation section 402 outputs switching command 1-2 to the register R0 in the third register 622.

When switching command 1-2 which is a delimiter command is received from the register R0, the second transfer section 72 does not output it to any register in the third register 622.

Namely, as shown in FIG. 15, at count #2 of counter 1, switching command 1-1 held in the register R1<1> is the only switching command held in the register R1<1>.

The command generation section 402 (shown in FIG. 11) outputs switching command 2-1 to the register R0 in the third register 622.

Since switching command 2-1 is to be outputted to the register R1<1> and it is not a delimiter command, the counter generation section 412 generates counter 2.

The second transfer section 72 performs the rightward shifting for the registers R1<1> to R1<3> in the third register 622.

Namely, switching command 1-1 held in the register R1<1> is outputted to the register R1<2> to be held there.

The second transfer section 72 receives switching command 2-1 held in the register R0 and outputs it to the register R1<1> in the third register 622.

The command generation section 402 outputs switching command 2-2 to the register R0 in the third register 622.

When switching command 2-2 which is a delimiter command is received from the register R0, the second transfer section 72 does not output it to any register in the third register 622.

Namely, as shown in FIG. 15, at count #4 of counter 1, switching commands 1-1 and 2-1 are held in the registers R1<2> and R1<1>, respectively.

The command generation section 402 (shown in FIG. 11) outputs switching command 3-1 to the register R0 in the third register 622.

Since switching command 3-1 is to be outputted to the register R1<1> and it is not a delimiter command, the counter generation section 412 generates counter 3.

The second transfer section 72 performs the rightward shifting for the registers R1<1> to R1<3> in the third register 622.

Namely, switching command 2-1 held in the register R1<1> is outputted the register R1<2> to be held there and switching command 1-1 held in the register R1<2> is outputted to the register R1<3> to be held there.

The second transfer section 72 receives switching command 3-1 held in the register R0 and outputs it to the register R1<1> in the third register 622.

The command generation section 402 outputs switching command 3-2 to the register R0 in the third register 622.

When switching command 3-2 which is a delimiter command is received from the register R0, the second transfer section 72 does not output it to any register in the third register 622.

Namely, as shown in FIG. 15, at count #6 of counter 1, switching commands 1-1, 2-1, and 3-1 are held in the registers R1<3>, R1<2>, and R1<1>, respectively.

At count #7 of counter 1, the second transfer section 72 (shown in FIG. 11) outputs, to the MUX 626-1, switching commands 3-1, 2-1, and 1-1 held in the registers R1<1> to R1<3>, respectively.

Namely, switching command 1-1 held in the register R1<3> is outputted to the second command execution section 52 via the MUX 626-1.

The second command execution section 52 outputs the control signals belonging to the group specified by the group identification information in switching command 1-1 in the output state specified by the output state information in the switching command.

Subsequently, the second transfer section 72 processes switching commands 4-1 and 4-2 similarly to the manner described above. As a result, at count #7 of counter 2, the second transfer section 72 outputs switching commands 4-1, 3-1, and 2-1 held in the registers R1<1> to R1<3> to the MUX 626-1.

Namely, switching command 2-1 held in the register R1<3> is outputted to the second command execution section 52 via the MUX 626-1.

The second command execution section 52 outputs the control signals belonging to the group specified by the group identification information in switching command 2-1 in the output state specified by the output state information in the switching command.

[Third Example Operation]

A third example operation of the third control signal generation section 62 performed for the switching command string shown in FIG. 16 will be described below.

The command generation section 402 (shown in FIG. 11) outputs switching command 1-1 to the register R0 in the third register 622.

Since switching command 1-1 is to be outputted to the register R1<1> and it is not a delimiter command, the counter generation section 412 generates counter 1.

The second transfer section 72 performs the rightward shifting for the registers R1<1> to R1<3> in the third register 622.

The second transfer section 72 receives switching command 1-1 held in the register R0 and outputs it to the register R1<1> in the third register 622.

The command generation section 402 outputs switching command 1-2 to the register R0 in the third register 622.

Even though switching command 1-2 is not a delimiter command, it is not to be outputted to the register R1<1>, so that the counter generation section 412 does not generate any counter.

The second transfer section 72 performs the rightward shifting for the registers R2<1> and R2<2> in the third register 622.

The second transfer section 72 receives switching command 1-2 held in the register R0 and outputs it to the register R2<1> in the third register 622.

The command generation section 402 outputs switching command 1-3 to the register R0 in the third register 622.

Even though switching command 1-3 is not a delimiter command, it is not to be outputted to the register R1<1>, so that the counter generation section 412 does not generate any counter.

The second transfer section 72 receives switching command 1-3 held in the register R0 and outputs it to the register R3<1> in the third register 622.

The command generation section 402 (shown in FIG. 11) outputs switching command 1-4 to the register R0 in the third register 622.

When switching command 1-4 which is a delimiter command is received from the register R0, the second transfer section 72 does not output it to any register in the third register 622.

Namely, as shown in FIG. 16, at counter #5 of counter 1, switching commands 1-1, 1-2, and 1-3 are held in the registers R1<1>, R2<1>, and R3<1>, respectively.

The command generation section 402 (shown in FIG. 11) outputs switching command 2-1 to the register R0 in the third register 622.

Since switching command 2-1 is to be outputted to the register R1<1> and it is not a delimiter command, the counter generation section 412 generates counter 2.

The second transfer section 72 performs the rightward shifting for the registers R1<1> to R1<3> in the third register 622.

Namely, switching command 1-1 held in the register R1<1> is outputted to the register R1<2> to be held there.

The second transfer section 72 receives switching command 2-1 held in the register R0 and outputs it to the register R1<1> in the third register 622.

When the second transfer section 72 processes switching command 2-2 similarly to the manner as described above, at count #7 of counter 1, switching commands 2-1, 1-1, 2-2, 1-2, and 1-3 are, as shown in FIG. 16, held in the registers R1<1>, R1<2>, R2<1>, R2<2>, and R3<1>, respectively.

At count #7 of counter 1, the second transfer section 72 outputs, to the MUX 626-1, switching commands 2-1 and 1-1 held respectively in the registers R1<1> and R1<2> in the third register 622 and the initial value held in the register R1<3>.

Also at count #7 of counter 1, the second transfer section 72 outputs, to the MUX 626-2, switching commands 2-2 and 1-2 held respectively in the registers R2<1> and R2<2> in the third register 622.

Namely, switching commands 1-1 and 1-2 held in the registers R1<2> and R2<2> are outputted to the second command execution section 52 via the MUX 626-1 and MUX 626-2, respectively.

At count #7 of counter 1, the second transfer section 72 outputs switching command 1-3 held in the register R3<1> to the second command execution section 52.

The second command execution section 52 outputs, at one time, the control signals belonging to the groups specified by the group identification information in switching commands 1-1 to 1-3 in the output states specified by the output state information in the switching commands.

When the second transfer section 72 processes switching commands 2-3, 2-4, 3-1, 3-2, and 4-1 similarly to the manner as described above, at count #7 of counter 2, switching commands 3-1, 2-1, 2-2, and 2-3 are, as shown in FIG. 16, held in the registers R1<1>, R1<2>, R2<1>, and R3<1>, respectively.

At count #7 of counter 2, the second transfer section 72 outputs, to the MUX 626-1, switching commands 3-1 and 2-1 held in the registers R1<1> and R1<2> in the third register 622 and the initial value held in the register R1<3>.

Also at count #7 of counter 2, the second transfer section 72 outputs, to the MUX 626-2, switching command 2-2 held in the registers R2<1> and the initial value held in the register R2<2>, both of which are in the third register 622.

Namely, switching commands 2-1 and 2-2 held in the registers R1<2> and R2<1> are outputted to the second command execution section 52 via the MUX 626-1 and MUX 626-2, respectively.

At count #7 of counter 2, the second transfer section 72 outputs switching command 2-3 held in the register R3<1> to the second command execution section 52.

The second command execution section 52 outputs, at one time, the control signals belonging to the groups specified by the group identification information in switching commands

2-1 to 2-3 in the output states specified by the output state information in the switching commands.

The image pickup device control signal generating apparatus according to the present invention makes it possible to generate, using a small circuit, many signals for controlling an image pickup device.

What is claimed is:

1. An image pickup device control signal generating apparatus to generate a plurality of control signals for controlling an image pickup device, the control signal generating apparatus comprising:

a control data generator which generates a plurality of control data, at respective predetermined timings, corresponding to the plurality of control signals;

a first storage unit which sequentially receives the plurality of generated control data at the respective predetermined timings and outputs one or more pieces of the received plurality of generated control data simultaneously at a predetermined timing corresponding to the respective predetermined timings for the one or more pieces of the received plurality of generated control data; and a control signal generator which generates, at one time, a plurality of control signal values corresponding to the one or more pieces of the received plurality of generated control data at the predetermined timing corresponding to the respective predetermined timings for the one or more pieces of the received plurality of generated control data, wherein the first storage unit includes a plurality of memory units arranged as a plurality of shift registers each of which has a different length, each of the memory units receiving and retaining the plurality of control data from one of the control data generator and the memory unit at a first stage according to the respective predetermined timings and outputting the retained control data to one of the plurality of memory units at a second stage and the control signal generator, wherein the plurality of control signals comprise at least one control signal having three levels.

2. The image pickup device control signal generating apparatus according to claim 1, further comprising:

a switching signal generator which generates a switching signal to make the control data generator generate the control data, wherein the control data generator generates the control data according to the switching signal.

3. The image pickup device control signal generating apparatus according to claim 1, further comprising:

a second storage unit which stores group identification data indicating which group the plurality of the control signals respectively belong to on the basis that the control signals may belong to one or more groups, wherein the control data includes group selection data to select one of the groups and output state data specifying a value of at least one of the plurality of control signals belonging to the selected group, and wherein the control signal generator includes a selector to select the at least one of the plurality of control signals belonging to the selected group based on the group identification data corresponding to the group selection data and a decoder to generate the at least one of the plurality of control signals thus selected in an output state corresponding to the output state data.

4. The image pickup device control signal generating apparatus according to claim 1, wherein the plurality of control signal values comprise one of two or three different values.

5. An image processing apparatus configured to control an image pickup device by using the image pickup device control signal generating apparatus according to claim 1.

6. An image pickup device control signal generating method for making a processor provided with a plurality of memory units arranged as a plurality of shift registers, each of which has different length, generate a plurality of control data to be used by a control signal generator to generate a plurality of control signals to be used for controlling an image pickup device, the method making the processor execute the steps of:

simultaneously generating according to a predetermined timing through the control signal generator the plurality of control signals having a value corresponding to the respective one or more pieces of the plurality of control data simultaneously output and generating the plurality of control data pieces one by one corresponding to the plurality of control signals according to the predetermined timing; and making the plurality of memory units respectively receive and retain at least one of the generated plurality of control data pieces and the control data from the memory unit at a first stage and simultaneously output the retained at least one of the generated plurality of control data pieces to one of the memory unit at a second stage and the control signal generator according to the predetermined timing, wherein the plurality of control signals comprise at least one control signal having three levels.

7. A non-transitory computer readable medium including a program for making a processor provided with a plurality of memory units arranged as a plurality of shift registers, each of which has a different length, generate a plurality of control data to be used by a control signal generator to generate a plurality of control signals to be used for controlling an image pickup device, the program making the processor execute the steps of:

simultaneously generating according to a predetermined timing through the control signal generator the plurality of control signals having a value corresponding to the respective one or more pieces of the plurality of control data simultaneously output and generating the plurality of control data pieces one by one corresponding to the plurality of control signals according to the predetermined timing; and making the plurality of memory units respectively receive and retain at least one of the generated plurality of control data pieces and the control data from the memory unit at a first stage and simultaneously output the retained at least one of the generated plurality of control data pieces to one of the memory unit at a second stage and the control signal generator according to the predetermined timing, wherein the plurality of control signals comprise at least one control signal having three levels.

8. The image pickup device control signal generating apparatus according to claim 1, wherein the plurality of control signals control an image sensor.

* * * * *